US008625852B2

(12) United States Patent
Caduff

(10) Patent No.: US 8,625,852 B2
(45) Date of Patent: Jan. 7, 2014

(54) SYSTEM AND METHOD FOR LINKING REAL-WORLD OBJECTS AND OBJECT REPRESENTATIONS BY POINTING

(71) Applicant: iPointer, Inc., Orono, ME (US)

(72) Inventor: David Caduff, Degen (CH)

(73) Assignee: iPointer, Inc., Bakersfield, CA (US)

( * ) Notice: Subject to any disclaimer, the term of this patent is extended or adjusted under 35 U.S.C. 154(b) by 0 days.

(21) Appl. No.: 13/947,719

(22) Filed: Jul. 22, 2013

(65) Prior Publication Data

US 2013/0307846 A1 Nov. 21, 2013

Related U.S. Application Data

(63) Continuation of application No. 13/413,008, filed on Mar. 6, 2012, now Pat. No. 8,494,255, which is a continuation of application No. 12/645,248, filed on Dec. 22, 2009, now Pat. No. 8,184,858.

(60) Provisional application No. 61/139,907, filed on Dec. 22, 2008.

(51) Int. Cl.
*G06K 9/00* (2006.01)
(52) U.S. Cl.
USPC ........................................ 382/103

(58) Field of Classification Search
None
See application file for complete search history.

(56) References Cited

U.S. PATENT DOCUMENTS 7,003,136 B1 * 2/2006 Harville .................. 382/103
2008/0070684 A1 * 3/2008 Haigh-Hutchinson ......... 463/32

* cited by examiner

*Primary Examiner* — Claire X Wang
(74) *Attorney, Agent, or Firm* — Wilmer Cutler Pickering Hale & Dorr LLP

(57) ABSTRACT

A system and method are described for selecting and identifying a unique object or feature in the system user's three-dimensional ("3-D") environment in a two-dimensional ("2-D") virtual representation of the same object or feature in a virtual environment. The system and method may be incorporated in a mobile device that includes position and orientation sensors to determine the pointing device's position and pointing direction. The mobile device incorporating the present invention may be adapted for wireless communication with a computer-based system that represents static and dynamic objects and features that exist or are present in the system user's 3-D environment. The mobile device incorporating the present invention will also have the capability to process information regarding a system user's environment and calculating specific measures for pointing accuracy and reliability.

22 Claims, 7 Drawing Sheets

SYSTEM AND METHOD FOR LINKING REAL-WORLD OBJECTS AND OBJECT REPRESENTATIONS BY POINTING

CROSS-REFERENCE TO RELATED APPLICATION

This continuation application claims priority under 35 U.S.C. §119(e) to U.S. application Ser. No. 13/413,008 entitled "System and Method for Linking Real World Objects and Object Representations by Pointing," filed on Mar. 6, 2012, which is a continuation of U.S. application Ser. No. 12/645,248 entitled "System and Method for Linking Real-World Objects and Object Representations by Pointing," filed on Dec. 22, 2009, which claims priority to U.S. Provisional Application 61/139,907 filed on Dec. 22, 2008, and entitled "System and Method for Linking Real World Objects and Object Representations by Pointing," the entire contents of which are incorporated herein in their entirety.

FIELD OF INVENTION

The present invention relates generally to computer-based systems and methods for identifying objects in the real world and linking them to a corresponding representation in a virtual environment. More specifically, the present invention relates to distributed computer-based systems and methods for linking objects or features presented to and pointed at by system users in a real world environment to representations of these objects or features in a two-dimensional virtual representation, and the identification and assessment of the reliability and accuracy of such identification by pointing to the object or feature.

BACKGROUND OF THE INVENTION

In recent years, pointing devices have become popular for different applications in diverse fields, such as location-based services (LBS), gaming, entertainment, and augmented reality applications. For example, LBS use pointing for identifying geographic objects and features, and return information about these objects or features to the systems user.

In gaming, pointing is becoming popular with handheld joystick-like devices, such as Nintendo's Wii® console. "Wii" is a registered trademark of Nintendo Corporation. These joystick-like device allows system users to perform movements for interfacing with the game. In these gaming systems, motion vectors are captured by sensors build into the handheld devices. These motion vectors are transmitted to the game engine and used to emulate gestures within the game scenario, allowing a mapping of actions from the real world into a virtual gaming environment.

Conventional laser pointers have been used for a long time to direct the audience's attention to specific objects displayed on a screen or within the environment where the presentation is taking place. This example further amplifies that "pointing" has a wide variety of uses and applications. These uses and applications will only increase as new handheld devices come onto the market that have increased capabilities for deducing position, determining the direction of pointing, as well as acceleration vectors of pointing gestures.

One of the problems associated with conventional "pointing" systems is they are inaccurate. This is mainly because the act of "pointing" is inherently ambiguous. This ambiguity arises because it is not always obvious at which object or feature the pointing device is actually directed when objects are close together or overlapping. Although there are many reasons for this inability to accurately identify objects or features through pointing, a main reason for this inaccuracy is that "line of sight" and "pointing direction" are not always aligned. Thus, the ray derived from the orientation of the pointing device may identify a different object or feature than the object or feature the observer (system users) is actually pointing at. This error or uncertainty is due to an inability of observers (system users) to exactly align their line of vision with the pointing direction.

A second main reason for pointing uncertainty is based on the inaccuracy of the device being used for pointing. This applies to sensors that determine the pointing device's location and sensors responsible for providing the direction of pointing. The direction of pointing refers to the orientation of the pointing device.

The readings of the two sets of sensors combine to derive the ray that is used for identifying the object or feature of interest. Both of these types of sensors typically have certain characteristics in terms of errors and uncertainty that are considered when attempting to identify objects or features in the real-world environment by pointing at them.

Another reason for pointing accuracy and uncertainty is that humans often resort to cognitive processes, such as verbal descriptions of the object or feature of interest, in order to compensate for pointing device errors. However, conventional computational pointing systems do not have such cognitive capabilities. As such, the system user's use of cognitive processes many times leads to erroneous object or feature identification or inaccurate pointing results.

The present invention overcomes the problems of conventional systems and provides a system and method that accounts for the deficiencies of such conventional systems and enhances pointing-based systems so they will more accurately identify objects or features of interest by pointing.

SUMMARY OF INVENTION

The present invention is a system and method for selecting and identifying a unique object or feature pointed at by a system user with a pointing device in his/her three-dimensional ("3-D") environment in a two-dimensional ("2-D") representation of that environment, which includes the same object or feature. The present invention may be incorporated in a mobile device, preferably a handheld device, that includes position and orientation sensors to determine the pointing device's position and pointing direction. The mobile device incorporating the present invention may be adapted for wireless communication with a virtual computer-based system that is capable of representing static and dynamic objects and features that exist or are present in the system user's real world environment. The mobile device incorporating the present invention will also have the capability to process information relating to a system user's environment and calculate specific measures for pointing accuracy and reliability.

Using the present invention, system users may point at objects or features with sufficient accuracy and consider sensor errors in order to identify the most likely object or feature to which the pointing device is being pointed. Further, using the present invention, system users will be capable of aligning their line of sight and the handheld device's pointing direction such that there is minimal uncertainty in pointing compared to the uncertainty or error caused by inaccurate position and direction readings by the handheld device sensors.

Handheld devices incorporating the present invention account for the peculiarities of human visual perception by considering the system user's visual perspective when pointing at objects or features of interest. These considerations add significantly to object identification and the reliability assessment process of the present invention.

The present invention includes modeling of perceptual and cognitive mechanisms, such as the generation of the system user's field of view at a given time and location and the grouping of objects and features in that field of view (e.g., set of buildings becomes the district in the visual scene). This modeling of perceptual and cognitive mechanisms enables the present invention to point at specific ornaments or features of objects, or groups of objects that are perceived as one entity by the system users for purposes of identification.

The present invention facilitates the integration of uncertainty of pointing derived from the identification of objects in the visual field and uncertainty derived from the inaccuracies of the sensors of the pointing device into the system and method of the present invention for accurate object or feature identification. This process may be used for identifying objects or features that exist in a 3-D environment in a 2-D virtual representation by pointing at such objects or features in the real world. This process is based in large part on the 3-D real-world representation being accurately represented in the 2-D virtual representation.

The present invention is not limited to a single spatial frame of reference, e.g., world geodetic system 84 ("WGS84"). The present invention is capable of being configured such that the coordinates of objects or features may be translated between multiple frames of reference. For example, such translation may be necessary for a system user to point at a 3-D object or feature on a 2-D TV screen or other displaying device and still effect accurate object identification. In this case, the system user and 2-D TV-screen are located in an absolute frame of reference, and the objects or features on the 2-D TV screen are located in the screen's local frame of reference. Given that the spatial configuration between the system user and 2-D TV screen, and the local coordinate system used for displaying the 3-D object on the 2-D TV screen are known, the present invention enables identifying objects or features on the 2-D TV screen using the pointing device.

The present invention also includes the capability for identifying moving objects or features present in the system user's 3-D environment or on 2-D screens. This capability is enabled by the moving objects or features also being represented in the virtual computer-based representation, and such moving object or features have their position and direction of movement updated in real time. According to the present invention, these moving object or features will be integrated in the 2-D virtual representation of the system user's visible 3-D environment and, therefore, made available for purposes of object or feature identification.

The system and method of the present invention will be described in greater detail referring to the drawings.

DETAILED DESCRIPTION OF THE PRESENT INVENTION

The present invention is a system and method for selecting and identifying a unique object or feature in the system user's three-dimensional ("3-D") real-world environment in a two-dimensional ("2-D") virtual representation of that environment that includes the same object or feature. Preferably, the present invention is incorporated in a handheld device that includes position and orientation sensors to determine the handheld device's position and pointing direction. Preferably, a handheld device incorporating the present invention is adapted for wireless communication with the computer-based system that includes static and dynamic representations of objects and features that exist or are present in the system user's real-world environment. A handheld device incorporating the present invention also has the capability to process information relating to the system user's real-world environment and calculate specific measures for pointing accuracy and reliability.

Figure 1:
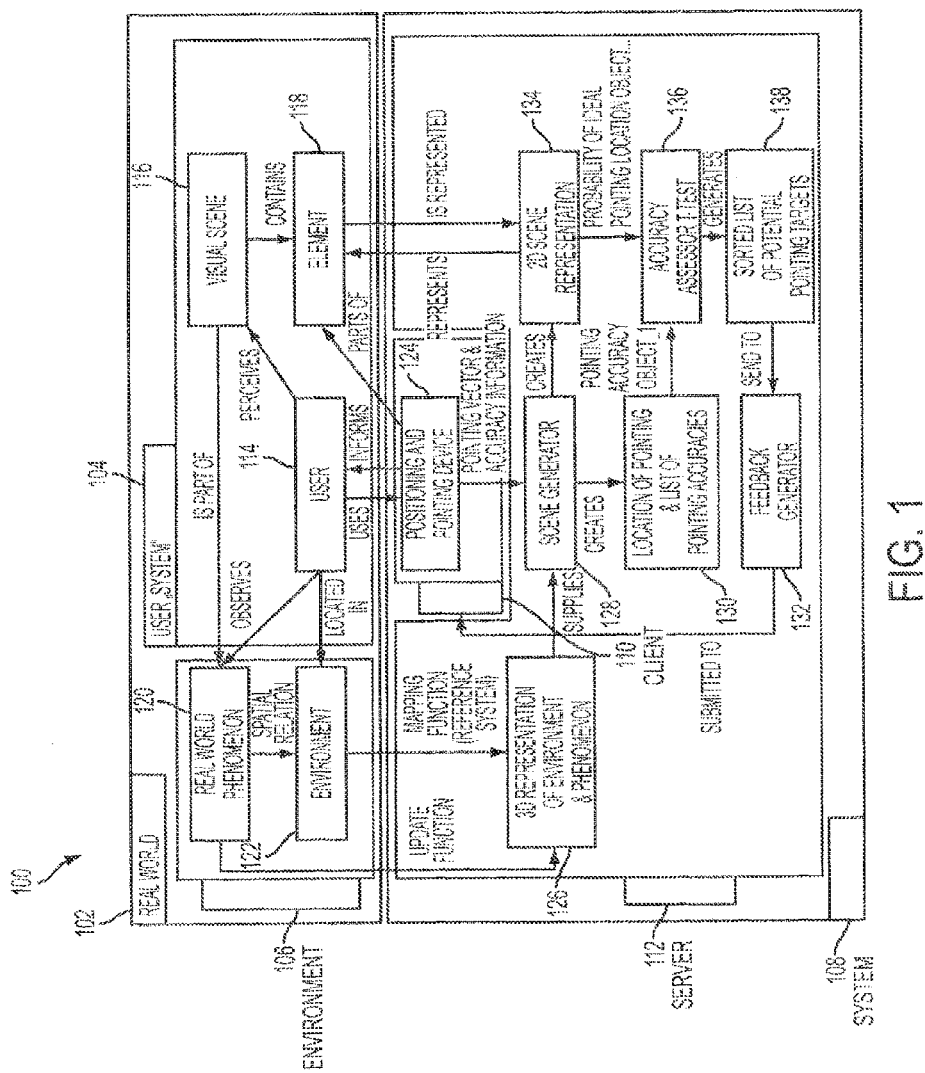
FIG. 1 shows a block diagram of a representative system for carrying out the present invention.

Referring to FIG. 1, generally at 100, a representative system for carrying out the present invention will be described. In FIG. 1, the real world is shown at 102 that includes system user element 104 and environment element 106. System user 114 in system user element 104 experiences environment element 106. FIG. 1 also shows a system 108 that includes system client 110 and system server 112. The interaction and interconnection of these elements will now be described.

Generally, system client 110 links object or features (represented by element 118) system user 114 perceives in visual scene 116 to their counterparts in the 2-D virtual representation based on pointing system client 110 at these objects or features 118 in visual scene 116 in the real-world. The objects or features in virtual scene 116 form the real world phenomenon 120 in environment 122. In carrying out the method of the present invention, preferably, there is an accounting for the inaccuracies of system components, such as in the client system sensors or other system sensors, and for the projective nature of human vision in order to ensure reliable identification of objects or features of interest based on pointing.

System user element 104 includes system user 114 that perceives objects or features of interest 118 to be identified in visual scene 116. System user 114 is located in environment 122 and observes real-world phenomenon 120. Visual scene 116 forms at least part of environment 122 that system user 114 perceives. Visual scene 116 will be based on the position and pointing direction of system client 110.

Information relating to visual scene 116 and real-world phenomenon 120 is input to system server 112 for scene generation. This is done by the visual scene information being part of the information from environment 122 that is mapped in 3-D representation form to system server 112 at 126. The 3-D representation is input to scene generator 128 to generate a 2-D virtual scene representation of the system user's environment at 134. System server 112 also will assess the pointing accuracy of client server 110 to identify the most probable object or feature the system user is pointing at.

Preferably, system client 110 includes a system user interface, sensors for generating the current position within an absolute 3-D frame of reference (e.g., WGS84 for GPS, local coordinate system for indoor positioning systems), and sensors for generating pointing direction as a two-valued vector representing pitch and yaw with respect to the absolute frame of reference. These measurements of system client 110 are processed by positioning and pointing device 124.

It is understood that in geodetic terms, pitch and yaw are referred to as elevation angle $\phi$ and azimuth $\theta$. Further, preferably system client 110 includes modules for time determination, e.g., a system clock, and for communicating with the system server. The module for communicating with system server 112 includes, but is not limited to, wireless communication methods, such as WiFi, HSDPA, GSM EDGE, UMTS, CDMA2000, and WiMAX.

Referring to system server 112, it includes a spatio-temporal representation of the system user's surroundings at 3-D Representation of Environment and Phenomenon 126, and scene generator 128 that generates an annotated 2-D scene representation at 134 of current visual scene 116 as perceived by system user 114 and based on information input from a module for communicating with system client 110. The temporal nature of the 3-D representation just described enables the present invention to point at and identify objects or features that are currently visible and/or moving through the visual scene. System server 112 also includes processes at 130, 132, 136, and 138 for (i) deriving probability values for actual pointing and probabilities for optimal pointing, (ii) performing statistical tests on these probabilities, and (iii) providing feedback to system user 114 through system client 110. The method of the present invention in view of the system elements shown in FIG. 1 will be described in detail subsequently.

Figure 2:
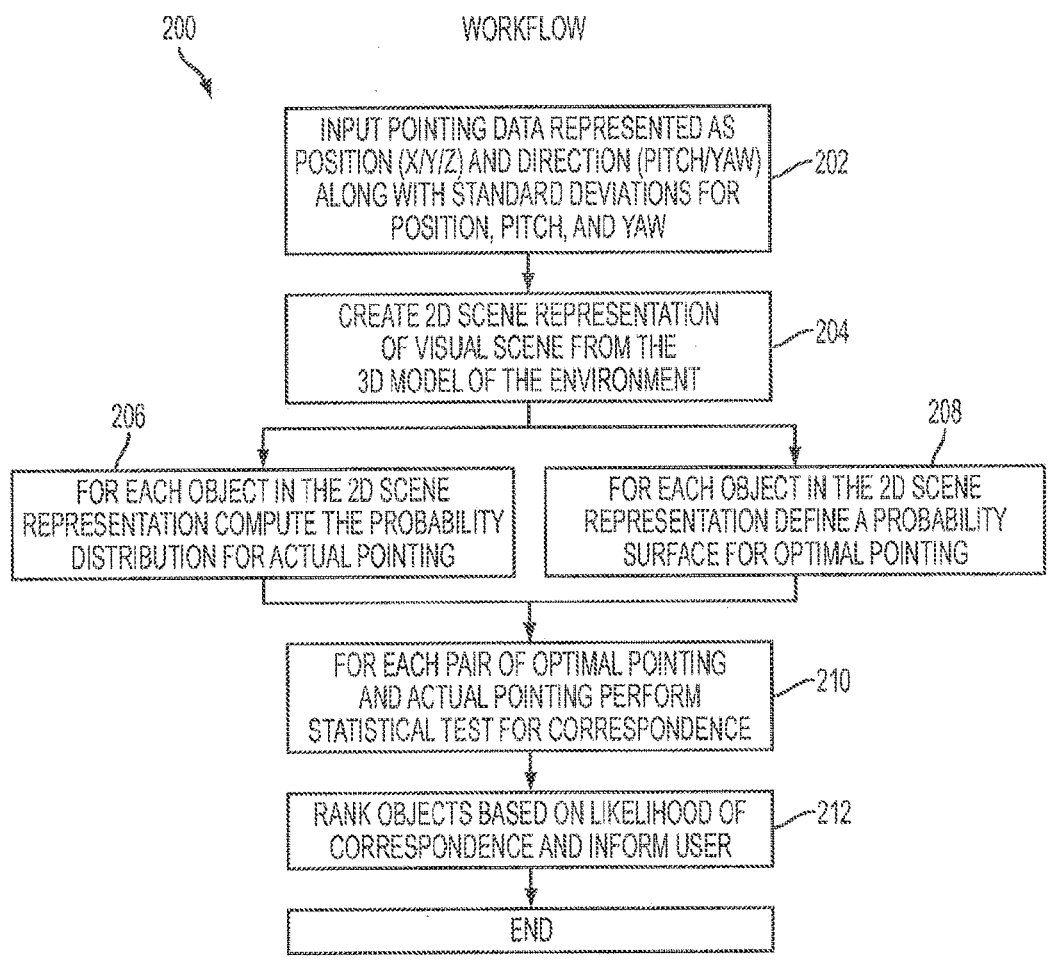
FIG. 2 shows a workflow for carrying out an exemplary method of the present invention.

Referring to FIG. 2, generally at 200, a preferable workflow according to the present invention is shown. This workflow is carried out by the system elements shown in FIG. 1 for the identification of the most likely object or feature to which system client 110 is being pointed. Generally, according to FIG. 2, there is (i) at 202 capture of the position and orientation of the pointing device, namely client server 110, and submission of the captured information to system server 112; (ii) at 204 generation of a 2-D scene representation of the visual scene perceived by the system user from the system user's 3-D spatio-temporal representation in the system server; (iii) at 208 generation of a set of probability surfaces for optimal pointing from the 2-D virtual scene representation; (iv) at 206 estimation of the distance from the system user's position to objects or features in the 3-D representation and calculating a set of probability ellipsoids at the object's or feature's estimated distance for assessing actual pointing accuracy (error propagation); (v) at 210 comparison of the pairs of probabilities for optimal pointing and actual pointing for individual objects or features; and (vi) at 212 ranking and providing feedback to the system user as to which object or feature a pointing device is most likely being pointed. The system configuration and workflow will be now described in greater detail.

People point at objects in real world every day. Although human vision and pointing are related, pointing does not necessarily translate into vision. An environmental scene surrounding a system user, with or without vision, can be generated and described by system server 112 from a 3-D representation or model of the real world. This scene generation corresponds to the mapping of the 3-D representation input to 3-D Representation of Environment and Phenomenon 126 into a projective 2-D virtual representation. In the projective 2-D virtual representation, object or features consists of faces or sides denoting the visible part of such objects or features. This 2-D virtual representation represents the configuration of system user 114's current visual scene 116. Visual scene 116 include static objects, such as buildings or city features, and also dynamic (moving) objects, such as cars or boats. The 2-D virtual representation also captures the restrictions in system user 114's visual scene, particularly in terms of distance of objects or features, visibility, and the occlusion of object or features. According to the present invention, based on the 2-D virtual representation and the pointing direction of system client 110, a set of computational steps may be performed to identify with substantial accuracy the object or feature to which system client 110 is being pointed.

Figure 3:
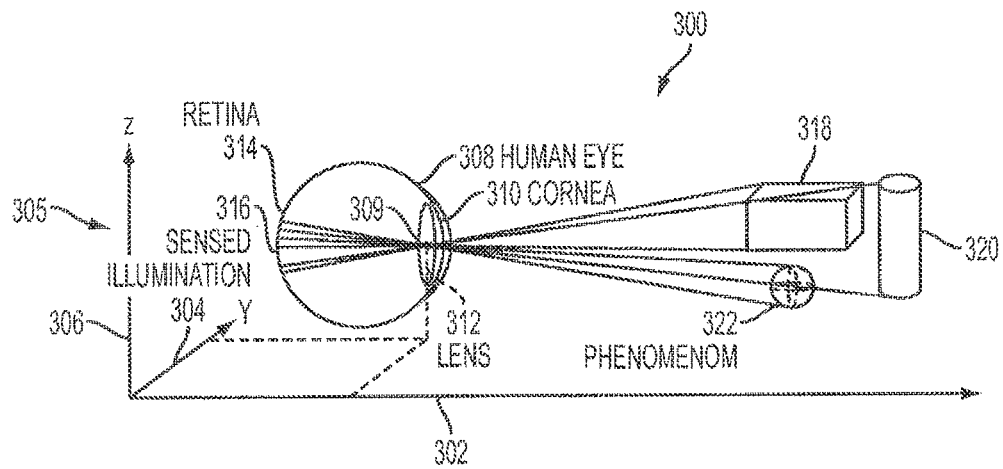
FIG. 3 shows an example of the optical principles for scene generation by the human visual system.

For purposes of the present invention, scene generation is a computational approximation of the human visual system. The human visual system permits people to assimilate information from the environment and point at the corresponding objects or features. FIG. 3 shows the optical principles of scene generation based on the human visual system.

Referring to FIG. 3, generally at 300, human eye 308 is shown with respect to three-coordinate system 305 and observed phenomenon, namely, building 318, silo 320, and molecular structure 322. A presence of the molecular structure as a phenomenon in FIG. 3 is provided to demonstrate that the object or feature of interest is not limited to only large-scale object or features. As such, the present invention may be used for identifying very small objects or features, for example, using a microscope, as objects or features of interest among other small objects or features.

Three-coordinate system 305 includes x-axis 302, y-axis 304, and z-axis 306. Eye 308 shows cornea 310, lens 312, and retina 314. As shown with regard to eye 308, focal point 309 of lens 312 is positioned within three-dimensional coordinate system 305. The eye elements are used to provide 2-D sensed illustration 316 on retina 314 of the 3-D real world scene that includes building 318, silo 320, and molecular structure 322.

The image on retina 314 is the perceptual representation of the observed real-world phenomenon at which the system user may point. The projective transformation from 3-D real-world objects or features into a 2-D image on retina is the "visual perspective." The visual perspective operates on the assumption that the observer is located a certain distance from the observed objects. As the objects or features become more distant, they will appear smaller because their angular diameter, visual angle, decreases. The visual angle of an object or feature is a triangle subtended at the eye by a triangle with the height of the object or feature as its base. Therefore, the further the object or feature is from the eye, the smaller the visual angle.

Figure 4:
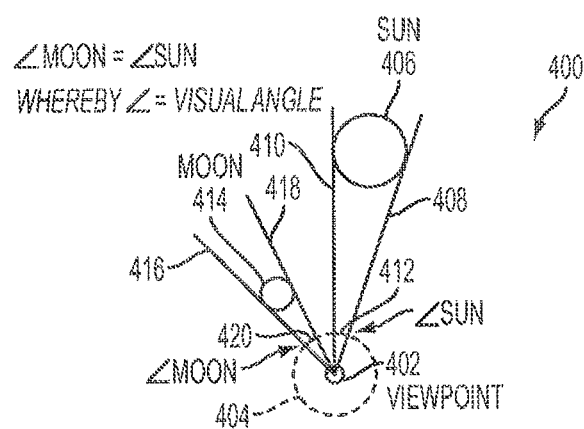
FIG. 4 shows a representation for the illustrating the concept of the influence of distance on the visual angle.

Referring to FIG. 4, generally at 400, the influence of distance on visual angle will be described as it relates to the human visual system. If the Sun and Moon were placed side by side, the Sun would be many times larger than the Moon. However, referring to FIG. 4, the Sun and Moon will appear the same size because the visual angle for the Sun and Moon is the same.

Again, referring to FIG. 4, from viewpoint 402, an observer would see Sun 406 subtended by rays 408 and 410. These rays will form visual angle 412 on phantom line circle 404 about view point 402 given the distance between viewpoint 402 and Sun 406. From viewpoint 402, Moon 414, which is much closer to viewpoint 402 than Sun 406, is subtended by rays 416 and 418. Rays 416 and 418 form visual angle 420 on phantom line circle 404, which is the same visual angle as visual angle 412. Therefore, when ∠Moon=∠Sun then the Moon and Sun will appear the same size from viewpoint 402 although the Sun is much larger than the Moon.

The relationship between distance and the apparent heights of objects is not linear. For example, if an object or a feature is actually extremely close to the eye, virtually touching the eye, it would appear infinitely tall based on a range of vision of the eye.

Again, referring to FIG. 1, the 3-D model of the environment at 3-D Representation and Phenomenon 126 that includes visual scene 116 containing objects and features of interest (element 118) is transformed at scene generator 128 into a 2-D virtual representation of the 3-D model. This 2-D virtual representation of the 3-D model forms the input for carrying out the remaining steps of the process of the present invention.

The computational generation of the 2-D virtual representation will be carried out using a projective transformation that projects the 3-D representation of real-world scene and objects or features within it into a 2-D view plane. For a more accurate imitation of a human vision perception of a real world, the transformation of the 3-D representation would be the projection onto a spherical 2-D representation. It is understood that the spherical 2-D representation is considered within the scope of the present invention.

Figure 5:
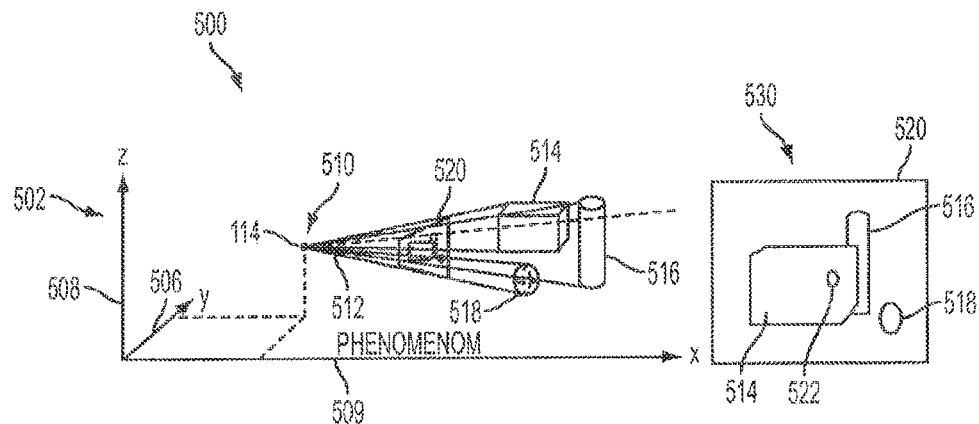
FIG. 5 shows a translation of a 3-D real-world representation to a 2-D virtual representation.

Referring to FIG. 5, generally at 500, the transformation of a 3-D representation of the real-world scene to a 2-D virtual representation will be discussed. In FIG. 5, three-coordinate coordinate system 502 is shown with x-axis 504, y-axis 506, and z-axis 508. System user 114 (FIG. 1) is shown at position 510 within three-coordinate system 502. At 510, the pointing direction of system client 110 is shown along ray 512. Therefore, from the viewpoint at 510 with pointing direction 512, the 2-D virtual representation 520 would be created. The 2-D virtual representation will be a flat, scaled-down version of the objects and features observed by the system user 114 in the real world.

2-D virtual representation 520 that is generated is shown in larger view at 530. The objects or features as viewed in the 2-D virtual scene representation would be the visible parts of phenomenon building 514, silo 516, and molecular structure 518. More specifically, 2-D virtual representation 520 shows the projected silhouettes of the visible parts of building 514, silo 516, and molecular structure 518. Further, the pointing direction (pointing location of ray 512) is shown at 522.

As stated, only silhouettes of objects or features would be seen from viewpoint 510 instead of the entire object or feature. Accordingly, the 2-D virtual representation that is generated by screen generator 128 forms the basis on which probabilities of optimal pointing and actual pointing may be assessed according to the process of the present invention. Further, based on probabilities associated with optimal pointing and actual pointing, the object or feature being pointed at by system client 110 is determined. The object identification process of the present invention will now be discussed in greater detail.

According to the present invention, the object identification portion of the process of the present invention is applied to the 2-D virtual representation generated at screen generator 128 and provided at 2-D scene representation 134. The object identification process according to present invention, preferably, includes at least the following five steps: (1) calculating of the distance from the system user to individual object or features in the visual scene at 116; (2) computing probability ellipsoids for pointing to individual object or features using error propagation; (3) defining the optimal pointing location on visible object or feature faces; (4) calculating probability surfaces for optimal pointing on an object or a feature; and (5) conducting statistical tests for determining correspondence between an object or feature, and the pointing direction of system client 110. The steps are shown in flow diagram form in FIG. 6 and these steps will be explained referring to FIGS. 7-11.

Figure 6:
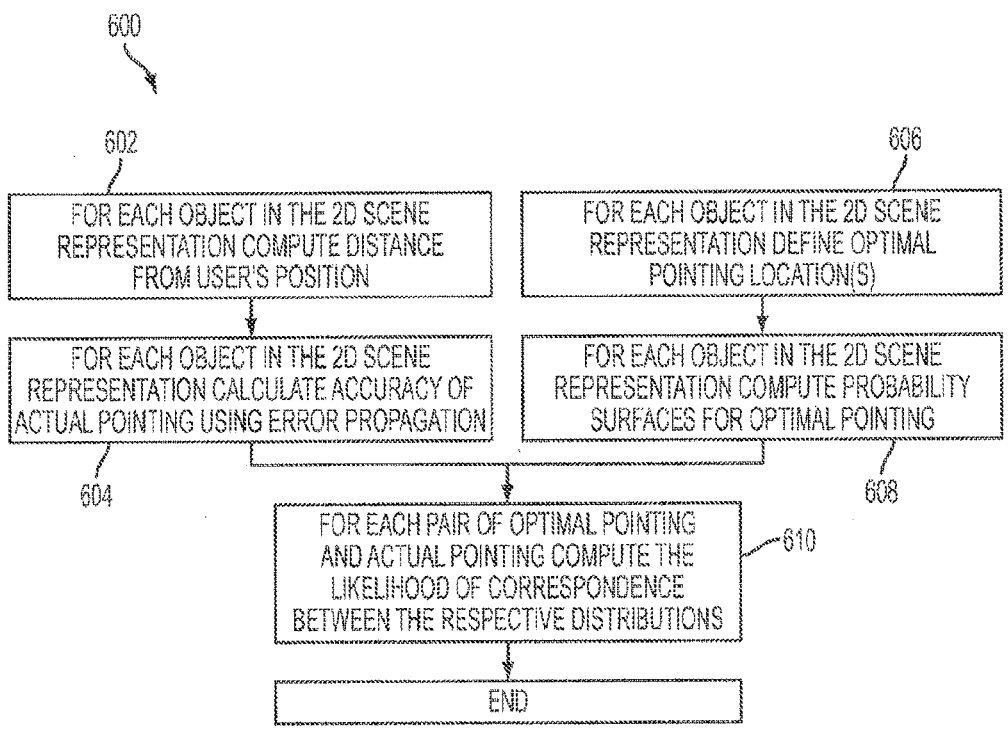
FIG. 6 shows a representative method for object or feature identification in a 2-D virtual representation.

FIG. 6, generally at 600, shows the steps of the process for object identification. Step 1 at 602 is for computing for each object or feature in the 2-D virtual representation its distance from the system user's position. Preferably, Step 1 will be carried out at Scene Generator 128 and 2-D Scene Representation 134. The output of Step 1 at 602 is input to Step 2 at 604. Step 2 at 604 is for calculating for each object or feature in the 2-D virtual representation the accuracy of actual pointing using error propagation. Preferably, Step 2 will be carried out at Scene Generator 128, 2-D Scene Representation 134, and Location of Pointing & List of Pointing Accuracies 130.

Preferably, in parallel with carrying out process Steps 1 and 2, the process for object identification will perform Step 3 at 606 and Step 4 at 608. Step 3 at 606 is for defining for each object or feature in the 2-D virtual representation its optimal pointing location. Preferably, Step 3 at 606 will be carried out at Scene Generator 128 and 2-D Scene Representation 134.

The output of Step 3 at 606 is input to Step 4 at 608. Step 4 at 608 is for calculating for each object in the 2-D virtual representation probability surfaces for optimal pointing. Preferably, Step 4 at 608 will be carried out at Scene Generator 128 and 2-D Scene Representation 134.

The output of Step 2 at 604 and the output of Step 4 at 608 are input to Step 5 at 610. Step 5 at 610 is for computing for each pair of optimal pointing and actual pointing the likelihood of the correspondence between the respective distributions. Step 5 at 610 will be carried out at Accuracy Assessor 136 and Sorted List of Potential Targets 138.

It is understood that each of the elements shown in system server 112 may be separate modules or integrated into one or more elements and still be within the scope of the present invention.

Figure 7:
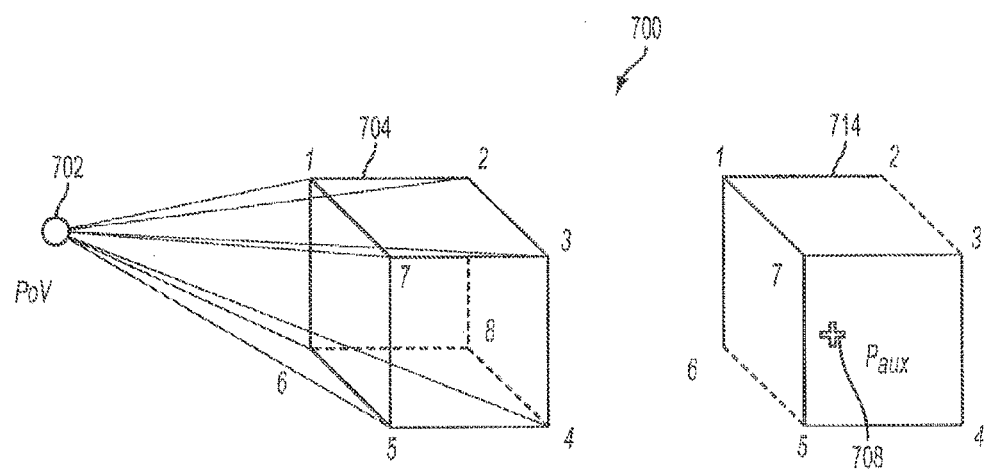
FIG. 7 shows an exemplary method for calculating a distance estimate for object or features.

Referring to FIG. 7, generally at 700, calculation of distance estimates from the system user's position to objects or features according to Step 1 at 602 (FIG. 6) will be described. According to Step 1, the distance to an object or a feature is estimated as a function of the coordinates of the system user's position and an auxiliary coordinate representing the object's or feature's visible area. In FIG. 7, the system user's position is shown at 702 and the auxiliary coordinate will be associated with a visible surface of cube 704. From the system user's point of view ("POV") at 702, the line projections are shown to each of the object's or feature's visible vertices, namely, line projections to the vertices 1, 2, 3, 4, 5, 6, and 7. Each of the line projections are used for calculating the auxiliary coordinate for each object or feature. Only the visible portions of the object or feature, in this case cube 704, contribute to the estimate of distance, as such the vertex at 8 is not used.

Expression 1 that follows is used for calculating the auxiliary coordinate for the distance estimate for objects or features in a visual scene, such as visual scene 116. Expression 1 is:

$$x_{P_{aux}} = \frac{1}{n} \cdot \sum_{i=1}^{n} x_i \quad (1)$$

$$y_{P_{aux}} = \frac{1}{n} \cdot \sum_{i=1}^{n} y_i$$

$$z_{P_{aux}} = \frac{1}{n} \cdot \sum_{i=1}^{n} z_i$$

where, $x_{P_{aux}}$=the x-coordinate of the auxiliary coordinate in a three-dimensional coordinate system.

$y_{P_{aux}}$=the y-coordinate of the auxiliary coordinate in a three-dimensional coordinate system.

$z_{P_{aux}}$=the z-coordinate of the auxiliary coordinate in a three-dimensional coordinate system.

n=is the number of visible vertices for each object or feature (which in FIG. 7, n=7).

$P_{aux}$=the auxiliary coordinate.

The distance, $d_0$, from the system user's POV 704 to the object's or feature's auxiliary coordinate, $P_{aux}$, is according to the Euclidean distance between two coordinates as set forth in Expression 2:

$$d_o = \sqrt{(x_{P_{aux}} - x_{P_oV})^2 + (y_{P_{aux}} - y_{P_oV})^2 + (z_{P_{aux}} - z_{P_oV})^2} \quad (2)$$

where, $x_{P_{aux}}$=from Expression 1.
$y_{P_{aux}}$=from Expression 1.
$z_{P_{aux}}$=from Expression 1.
$x_{POV}$=the x-coordinate of the system user at the POV.
$Y_{POV}$=the y-coordinate of the system user at the POV.
$z_{POV}$=the z-coordinate of the system user at the POV.

Referring again to FIG. 7, distance $d_0$ will be the distance from the POV at 702 to auxiliary coordinate $P_{aux}$ at 708 located at the center of gravity of the surface bounded by vertices 1, 2, 3, 4, 5, 6 and 7. Auxiliary coordinate 708 would be positioned at this location in the center of gravity of vertices 1, 2, 3, 4, 5, 6 and 7 because this location represents the perceived distance between the system user location and location of the object. Following in the calculation of distance $d_0$ according to Step 1 at 602, this calculation is input to Step 2 at 604.

As stated, Step 2 at 604 of the process of the present invention, the accuracy of actual pointing with regard to each object or feature in the 2-D virtual representation is calculated preferably using error propagation.

The accuracy of pointing based on the pointing direction of system client 110 is influenced by the accuracy of sensor measurements by the system client 110 sensors and distance $d_0$ that was calculated at Step 1 (602). Error propagation considerations incorporated at Step 2 include geodetic error propagation. Further, the determination of the uncertainty of pointing with respect to sensors preferably accounts for individual sources of error associated with the sensors.

A potential source of error relates to sensor measurements includes, but is not limited to, sensor errors associated with the measurement of latitude, longitude, height, azimuth, and elevation angle. These sensor measurements and distance $d_0$ will be used to calculate a representative coordinate for each such object or feature to determine actual pointing accuracy. The representative coordinate enables the determination of the influence of each individual error source of the overall standard deviation based on the assumption system user 114 is pointing at a specific object or feature in visual scene 116.

Typically, "standard deviations" are meant to provide a level of confidence in statistical conclusions. However, according to the present invention, "standard deviation" will be used to characterize the distribution underlying the probabilistic method for object or feature identification. The standard deviation of the representative coordinate according to present invention is a result of error propagation and can be calculated by the partial differentials of the function used for calculating the representative coordinate. According to the present invention, geodetic error propagation is determined according to Expression 3 on a function $f$ with n variables:

$$\sigma_f = \sqrt{\sum_{i=0}^{n}\left(\left(\frac{\partial f}{\partial i}\right)^2 \cdot \sigma_i^2\right)} \quad (3)$$

where, $\sigma_i$=a standard deviation of the corresponding variable.

$\frac{\partial f}{\partial i}$ = a partial derivative that describes the influence that the uncertainties of individual variables have on the function's standard deviation.

Figure 8:
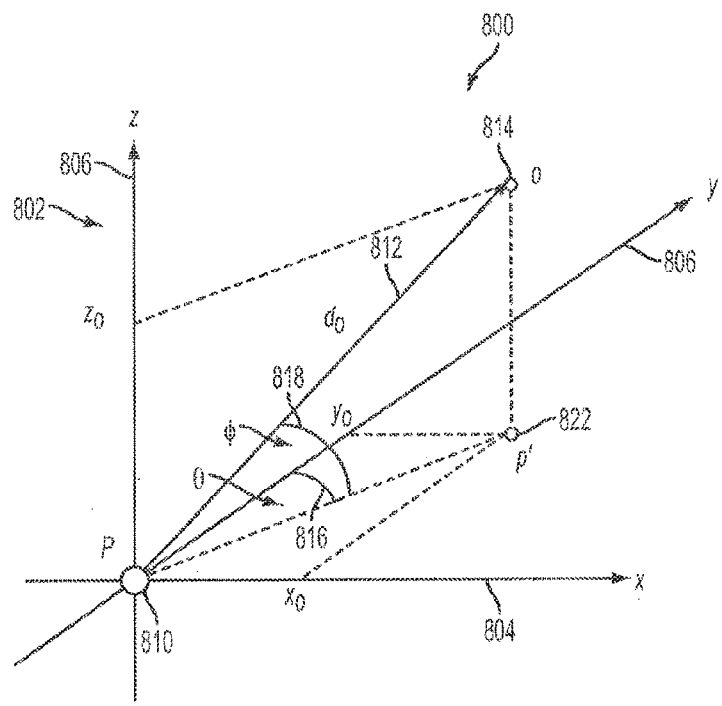
FIG. 8 shows a 3-D graphical representation associated with the calculation of pointing accuracy.

Referring to FIG. 8, generally at 800, an exemplary determination of geodetic error propagation will be described. In FIG. 8, three-coordinate system 802 has x-axis 804, y-axis 806, and z-axis 808. Point p 810 at the origin represents the system user's POV. Point o 814 represents the representative coordinate to be determined and Point o is separated from the system user's Point p 810 by distance $d_0$ 812. As shown, azimuth angle $\theta$ is at 816 and elevation angle $\phi$ is at 818. Further, three-dimensional Point o 814 maps to Point p' 822 in the two-dimensional x-y plane.

According to FIG. 8, the variables for determining the representative coordinate of the object or feature of interest include the coordinate of the system user's position at Point p 810 having coordinates $x_p$, $y_p$, $z_p$; yaw, azimuth angle $\theta$ at 816; pitch, elevation angle $\phi$ at 818; and distance $d_0$ 812 to the object or feature. Standard deviations for purpose of the present invention may be in terms of metric distance for position coordinates and distance and radial distance, for pitch and yaw. For example, metric distance may be represented by $\sigma_x$=5 m and radial distance may be represented by $\sigma_\psi$=0.5 rad.

Noting the foregoing, preferably, error propagation for pointing accuracy may be determined using Expression 4:

$$x_o = x_p + d_0 \cdot \cos(\phi) \cdot \sin(\theta)$$

$$y_o = y_p + d_0 \cdot \cos(\phi) \cdot \cos(\theta)$$

$$z_o = z_p + d_0 \cdot \sin(\phi) \quad (4)$$

Given Expressions 3 and 4, the standard deviation of the representative coordinate, which will be used to determine the likelihood the system user is pointing at a specific object or feature, preferably will be calculated according to Expression 5:

$$\sigma_x = \sqrt{\left(\frac{\partial x_O}{\partial x_p}\right)^2 \cdot \sigma_{x_p}^2 \left(\frac{\partial x_O}{\partial d_O}\right)^2 \cdot \sigma_{d_O}^2 + \left(\frac{\partial x_O}{\partial \phi}\right)^2 \cdot \sigma_\phi^2 + \left(\frac{\partial x_O}{\partial \theta}\right)^2 \cdot \sigma_\theta^2} \quad (5)$$

$$\sigma_y = \sqrt{\left(\frac{\partial y_O}{\partial y_p}\right)^2 \cdot \sigma_{y_p}^2 \left(\frac{\partial y_O}{\partial d_O}\right)^2 \cdot \sigma_{d_O}^2 + \left(\frac{\partial y_O}{\partial \phi}\right)^2 \cdot \sigma_\phi^2 + \left(\frac{\partial y_O}{\partial \theta}\right)^2 \cdot \sigma_\theta^2}$$

$$\sigma_z = \sqrt{\left(\frac{\partial z_O}{\partial z_p}\right)^2 \cdot \sigma_{z_p}^2 \left(\frac{\partial z_O}{\partial d_O}\right)^2 \cdot \sigma_{d_O}^2 + \left(\frac{\partial z_O}{\partial \phi}\right)^2 \cdot \sigma_\phi^2}$$

For purposes of the present invention, if in determining the standard deviation according to Expression 5 a particular variable is not available, that variable will be viewed as a constant. As such, in practical terms, the partial derivative of such a variable will be left out. For example, if the standard deviation for distance $d_O$ is not known, the partial derivative for distance $d_O$ will not be included in the determination.

In determining pointing accuracy according to the present invention, the principal focus is on the application of geodetic error propagation for estimating the standard error of pointing associated with an object or a feature. Accordingly, the distance estimation function and the coordinate calculation function according to the Expressions above may be replaced by other functions or estimating methods and still be within the scope of the present invention. For example, alternative functions, include but are not limited to, (i) determining the standard deviation of pointing accuracy using transformations across multiple spatial frames of reference or (ii) standard deviation of pointing accuracy may need to be aligned with a local coordinate system for further processing.

The determination of pointing accuracy at Step 2 at 604 is one of the inputs to Step 5 at 610. The generation of the second input to Step 5 involving Steps 3 and 4 at 606 and 608, respectively, will now be described.

Step 3 at 606 is for defining the optimal pointing location for each object in the 2-D visual scene representation. In referring to the optimal pointing location, the present invention considers certain preferable actions and considerations of the system user. These considerations include that system users do not randomly point at objects or features, and typically points at the center of an object's or a feature's visible surface or a salient feature associated with the object or feature of interest. For example, if the system user is pointing at a rectangle façade of the building, the system user would tend to point at the center mass of the façade rather than at the edges. However, in the case of arcs or archways, the optimal pointing location for the system user may not be as obvious as in a situation with a rectangle façade and the optimal pointing location may require a more careful definition as will be discussed.

According to the present invention, the optimal pointing location is not a characteristic of the object or feature as a whole, but depends on the system user's point of view and the visible parts of the object or feature presented to the system user. As such, preferably, the present invention will generate the 2-D virtual scene representation before defining the optimal pointing location.

In defining the optimal pointing location, the geometry of the object or feature is not the only consideration. The optimal pointing location may be significantly influenced by the salient features or unusual characteristics of the object or feature, including the attentive and nonattentive features, for example, texture, color, material, or ornaments. These features, however, may be dependent on the nature of the real-world phenomenon. For example, a building that has a salient window or ornaments may attract a system user's attention and have a significant influence on the optimal pointing location with respect to that building. As another example, if there is a screen display of molecules or molecular structures based on microscopic investigations, certain molecules or molecular structures may be considered more salient and prominent than others, again influencing the optimal point location. According to the present invention, these characteristics or features may be integrated as part of the 3-D real world representation of the environment and used in the definition of the optical pointing location.

For purpose of example only, if a building had a low level, center mass door for entering and leaving the building and a 12 foot high bronze statue of an ornamental horse that is toward the right side of the front of the building and the horse had become famous with its association to that building, then the horse would be considered a significant influence on the optimal pointing direction for the building.

Noting the foregoing, the definition of the optimal pointing location will depend on the shape of the visible faces of the object or feature as presented to the system user. According to Step 3, the definition that is input to Step 4 will be based on the following disclosure.

The definition of the optimal pointing location is according to rules and heuristics defined by the system administrator and by previous results of the calculation of pointing locations. The rules and heuristics are defined a-priori based on expert knowledge at 3-D Representation of Environment 126 and the influence of the generation of the 2-D virtual scene at runtime of the Scene Generator 128 and 2-D Scene Representation 134. The rules and heuristics, for example, may be defining a set of prototypical geometries (U-Shape, L-Shape, etc) along with their optimal pointing locations, subdividing complex geometries and defining optimal pointing locations for each part, or analyzing previous pointing events for given geometries and setting the optimal pointing location accordingly. The learning process employed by Scene Generator 128 and 2-D Scene Representation 134 may include, but is not be limited to, the following, 1) recording pointing events, 2) associating pointing events with location on objects and features, 3) statistically deriving optimal pointing location based on clustering of pointing events for each face, 4) refining pointing location for objects and features by repeating steps 1, 2 and 3.

At Step 4, the present invention determines the probability surface for optimal pointing from the system user's position and the visual outline of the object or feature presented, for example, in 2-D virtual representation at 520 in FIG. 5.

Figure 9:
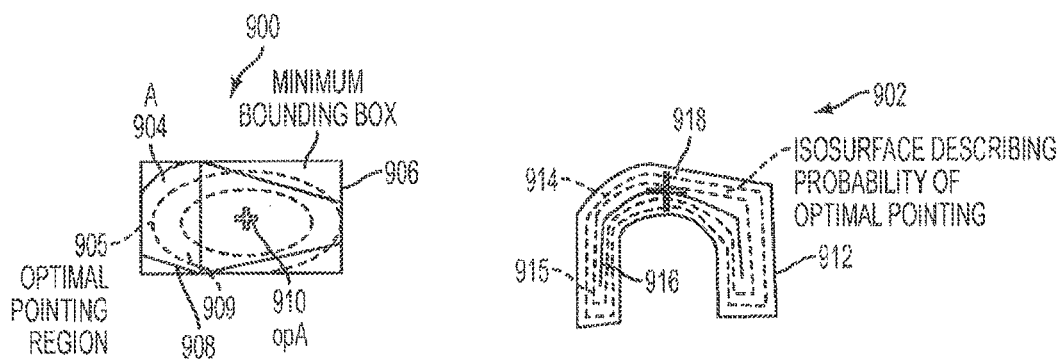
FIG. 9 shows the visual portion of objects or features for defining the optional pointing locations for convex shapes and concave shapes.
Figure 10:
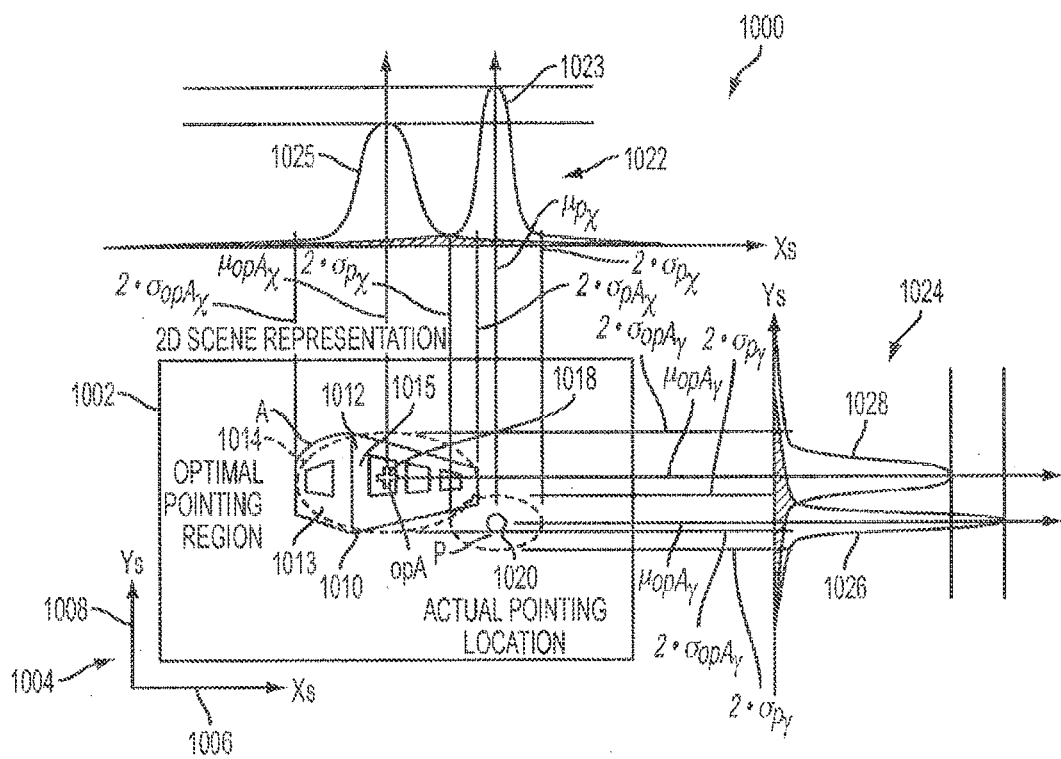
FIG. 10 shows an example of statistical testing according to the process of the present invention.

Referring to FIG. 9, examples for determining the probability surfaces for optimal optical pointing for regular and irregular shapes will be discussed. For purposes of discussing determining the probability surfaces of optimal pointing for regular shapes, regular shapes are objects or features with "convex faces," which would include square or rectangular shapes. For purposes of discussing determining the probability surfaces of optimal pointing for irregular shapes, irregular shapes are objects or features with "concave faces," which would include arcs or archways.

Again referring to FIG. 9, generally at 900, regular shape 904 is shown and, generally at 902, irregular shape 912 is shown. Preferably, according to the present invention, the determination of probability surfaces for regular shaped objects or features will be carried out using the minimum bounding rectangle method. Calculating the optimal pointing probability using the minimum bounding rectangle method will result in minimum bounding rectangle 906 having optimal pointing region 908 that contains concentric ellipsoids 909. The center of optimal pointing region 908 at location 910 would have the highest probability for the optimal pointing location. This location would be on visible surface 907 of object or feature 904 rather than visible surface 905.

Preferably, in FIG. 9 at 902 with regard to irregular shaped objects or features, the present invention will determine the probability of surfaces optimal pointing using an isoline that describes the irregular shaped object or feature. At 902, irregular shaped object or feature 912 has optimal pointing region 914 containing concentric polygons 915. This optimal pointing location in region 914 would be isoline 916.

Having calculated isoline 916 using conventional means, a determination of the probability of optimal pointing preferably will include the consideration of human cognitive characteristics. For example, the probability assignment or weighting for lateral and vertical pointing may be defined differently due to humans tending to point more accurately to lateral than to vertical dimensions. Therefore, using this consideration, the optimal pointing location for irregular shape 912 would be at 918 on isoline 916.

However, cognitive considerations can have probability values set by the system administrator or as default settings to reflect the likelihood of optimal pointing. It is understood, however, that other considerations may be used for determining the probability of optimal pointing for irregular shaped objects or features and still be within the scope of the present invention.

Once the optimal pointing location is defined according to Step 3 at 606, the definition is input to Step 4 at 608. Step 4 determines the probability surface for optimal pointing for each object in the 2-D virtual representation. The output of Step 4 is the second input to Step 5 at 610.

Step 5 at 610 determines the likelihood of correspondence between respective distributions for each pair of optimal pointing and actual pointing determinations to assess the level of reliability that the pointing direction is aimed at a specific object or feature in visual scene 116. As will be described, the assessment at Step 5, preferably uses statistical processes for effecting the assessment.

According to the present invention, preferably a statistical t-test is used for assessing correspondence of the distributions. However, it is understood that other statistical methods may be used and still be within the scope of the present invention.

According to the present invention, the statistical t-test will determine the likelihood that the distribution defined by the actual pointing location and standard deviation of pointing according to Step 2 at 604 is the same as the distribution defined by the object's or feature's optimal pointing surface according to Step 4 at 608.

With regard to the statistical t-test, generally it will compare the differences between two means in relation to the variation in data. For purposes of the present invention with respect to the statistical t-test, preferably, for each object or feature there will be two independent samples for comparison. The first is an optimal pointing sample according to Step 4 and the second is an actual pointing sample according to Step 2. There also is an initial assumption that the variance in the two samples will be unequal. The samples are parameterized by the representative coordinate for actual pointing and the optimal pointing location along with their standard deviations. The t statistic that results from the assessment tests whether the population means are different. The t statistic is determined according to Expressions 6 and 7:

$$t = \frac{\mu_{act} - \mu_{opt}}{s_{\mu_{act} - \mu_{opt}}} \quad (6)$$

where, $$s_{\mu_{act} - \mu_{opt}} = \sqrt{\frac{\sigma^2_{\mu_{act}}}{n_{act}} + \frac{\sigma^2_{\mu_{opt}}}{n_{opt}}} \quad (7)$$

whereby, $\mu$=corresponds to the sample mean for normal distributions of each sample.

$\sigma$=standard deviations of the distributions.

s=an estimator of the common standard deviation.

n=the representative sample size for actual pointing and optimal pointing.

For purposes of the present invention, n depends on a number of observations that were made that lead to the estimation of the standard deviation for the location and orientation of system 110 (the pointing device). Further, n for optimal pointing is dependent on the modeling of the optimal pointing location according to the method used for the definition. In the case of rules and heuristics, n depends on the nature of the heuristics, and in the case of learning algorithms, n depends on the number of previous observations.

Preferably, in carrying out the process of Step 5 at 610, each object's or feature's distribution for optimal pointing is compared to the distribution of actual pointing resulting in a list of t-values for each pair. These resultant t-values are analyzed to determine the probability that a significant difference exists between the two samples of each optimal pointing-actual pointing pair that will determine the likelihood of a specific object or feature in being pointed at by the system user.

The t-test may be performed laterally, vertically, or for both axes and still be within the scope of the present invention. The statistical t-test results may be integrated into one measure for reliability of pointing using an Euclidean distance for the two measures for example according to Expression 8:

$$t_{tot} = \sqrt{t_{lat}^2 + t_{ver}^2} \quad (8)$$

where, $t_{tot}$=the total t-test results for the lateral and vertical optimal pointing and actual pointing standard deviations.

$t_{lat}$=the t-test results for the lateral optimal pointing and actual pointing standard deviations.

$t_{ver}$=the t-test results for the vertical optimal pointing and actual pointing standard deviations.

The preferred method may be replaced by a weighted Euclidean distance, if lateral and vertical pointing are not equally important and it will still be within the scope of the present invention.

Referring to Figure, 10 generally at 1000, an example of statistical testing used by the system of the present invention will be described. It is understood that the statistical t-test is the preferred method for conducting the comparisons at Step 5; however, it is understood that other statistical methods may be used and still be within the scope of the present invention.

Yet again referring to FIG. 10, 2-D scene representation 1002 is based on two-coordinate system 1004 having x-axis 1006 and y-axis 1008. 2-D scene representation 1002 includes visible object 1010 and actual pointing location 1020. Given that the object face has a regular shape, the minimum bounding rectangle method may be used for determining the probability surface for optimal pointing. Using the minimal bounding rectangle method, optimal pointing region 1014 is determined and the center of that region is at 1018.

Again, referring to FIG. 10, the t-test setup for a pair of standard deviations for optimal pointing location 1018 and actual pointing location 1020 is shown. The standard distributions for optimal pointing 1018 and actual pointing 1020 are compared according to Step 5 in the x and y directions at 1022 and 1024, respectively. The distribution curves at 1022 show the degree of overlap between the lateral distribution for actual pointing at 1023 and the lateral distribution for optimal pointing at 1025, whereby the area of overlap defines the probability that the two distributions correspond. Further, the distribution curves at 1024 show the degree of probability that the two distributions correspond in the vertical direction. As is shown, the vertical distribution for actual pointing is at 1026 and the vertical distribution for optimal pointing is at 1028. As with the lateral distributions, the overlap of the vertical distributions showed a probability that the two distributions correspond.

The total overlap of the lateral and vertical optimal pointing and actual pointing distributions will provide the total correspondence of optimal pointing and actual pointing for evaluation of the likely object being pointed at by the pointing device.

The results of the comparison process of Step 5 at 610 is a list of reliability measures that reflect to what degree the pointing is directed to specific objects or features. For example, the following is a representative list of such results:

Pair t-test for Actual Pointing and: Result t-test
1) Optimal Pointing for Object A 0.45
2) Optimal Pointing for Object B 0.18
3) Optimal Pointing for Object C 0.82
4) Optimal Pointing for Object D 0.75

From the above list, Object C at number 3 would be the winner because the result of the t-test indicates the highest probability of correspondence. As such, it would be determined Object C is most likely object or feature to which a system user is pointing. The result of Step 5 is the identification of the object or feature most likely being pointed at. This also results in the linking of the real world objects or features to virtual objects or features. The linking information can be used for other observations and linking between the real world and the 2-D virtual representation.

The Gaussian function and statistical tests that are adapted for use in the system and method of a present invention for optimal pointing and actual pointing consider the distribution anomalies associated therewith. For example, pointing at the periphery of a building instead of the middle results in a lower likelihood that the object or feature is the one to which the pointing device is actually being pointed. Further, given the projected nature of the visual system and the resulting perspective, it is likely the system user is pointing at an object or feature in the background rather than the object or feature that is intersected by the pointing ray.

Figure 11:
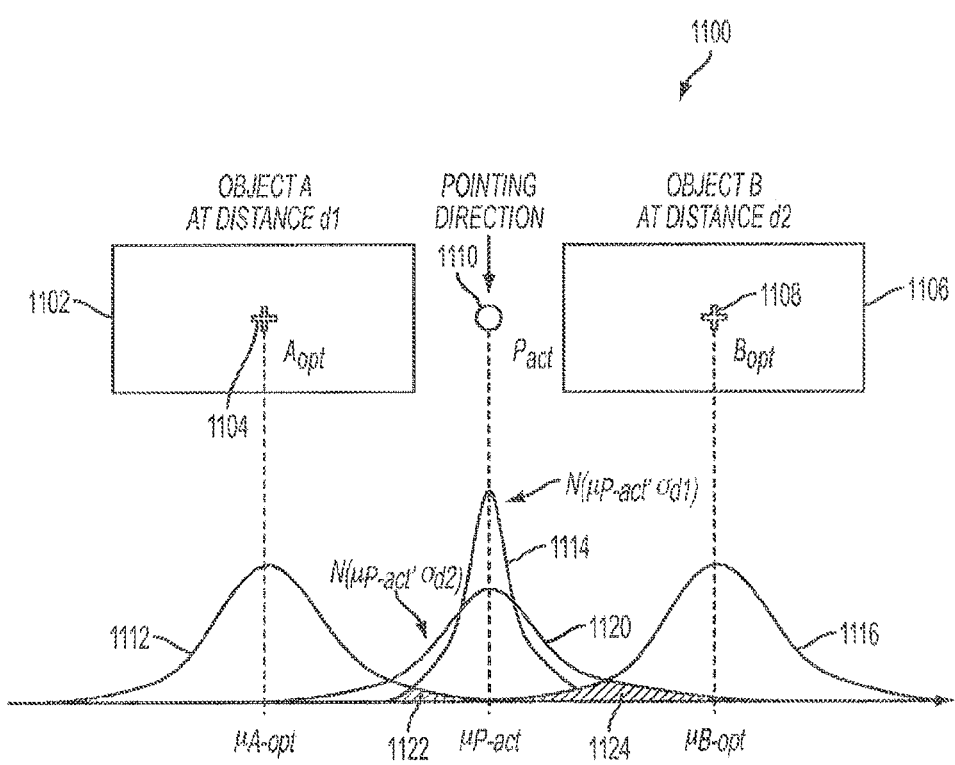
FIG. 11 shows an example of the use of the method of the present invention.

Referring to FIG. 11, generally at 1100, an example will be described for selecting the actual object being pointed at by evaluating the distributions associated with each object or feature considering distribution anomalies when two objects may lie in the same pointing direction. Object A at 1102 with optimal pointing location 1104 and object B at 1106 with optimal pointing location 1108 have the same geometric properties in the 2-D scene representation. However, the distance d1 from the system user's position to object A is shorter than distance d2 from the system user's position to object B. Object A has optimal pointing distribution 1112 and standard distribution 1114. These distributions for object A overlap at 1122. Object B has optimal pointing distribution 1116 and standard distribution 1120. These distributions for object B overlap at 1124.

Again, referring to FIG. 11, the distributions for actual pointing are the same for each object but the standard deviations are unequal. The actual pointing directions for both objects is exactly the same, the present invention would identify object B as the object most likely being pointed at because the overlap of the distributions associated with object B is of a higher degree than for object A as shown by comparing the areas at 1122 and 1124. This is because this area corresponds to the outcome of the statistical test for the likelihood of corresponding distributions.

It is understood that the elements of the systems of the present invention may be connected electronically by wired or wireless connections and still be within the scope of the present invention.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments or portions thereof may also be implemented as a machine-readable storage medium, configured with a computer program, where, upon execution, instructions in the computer program cause a machine to operate to perform the functions of the embodiments described above.

The embodiments or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principles set forth below may be applied to other embodiments and applications. Thus, the present invention is not intended to be limited to the embodiments shown or described herein.

The invention claimed is:

1. A computer-implemented method for determining a likelihood a moving object in a real-world scene is an object being pointed at by a mobile device that includes capabilities of a pointing device, comprising the steps of:
   (A) pointing a mobile electronic device that includes capabilities of a pointing device (mobile device) at a moving object of interest in the real-world scene;
   (B) generating with the mobile device a mobile device geodetic position and pointing direction, and transmitting the mobile device geodetic position and pointing direction, and standard deviations relating to generating the mobile device geodetic position and pointing direction to a system server;
   (C) mapping a three-dimensional representation of a real-world scene containing the objects in the real-world scene, including the moving object of interest, and transmitting the three-dimensional representation to the system server;
   (D) a system server performing the substeps of,
      (1) generating a two-dimensional virtual digital representation of the three-dimensional scene mapped at step (C), with the two-dimensional digital virtual representation including at least a virtual digital representation of the objects in the real-world scene, including the moving object of interest,
      (2) determining for each object, including the moving object of interest, in the two-dimensional virtual digital representation a distance estimate from the mobile device geodetic position to each such object, including the moving object of interest,
      (3) determining for each object, including the moving object of interest, in the two-dimensional virtual digital representation an accuracy of actual pointing and in determining the accuracy of pointing according to substep (D)(3) using standard deviations transmitted at step (B) caused by the mobile device in generating the mobile device geodetic position and pointing direction and the distance estimate for each object determined at substep (D)(2),
      (4) defining for each object, including the moving object of interest, in the two-dimensional virtual digital representation an optimal pointing location relating to a visible part of each object, including the moving object of interest,
      (5) determining for each object, including the moving object of interest, in the two-dimensional virtual digital representation a probability surface for optimal pointing from the mobile device geodetic position applying the definition for each object defined at substep (D)(4),
      (6) determining for each object, including the moving object of interest, in the two-dimensional virtual digital representation, a numeric correspondence between actual pointing accuracy and optimal pointing location by comparing a standard deviation for the actual pointing accuracy determined at substep (D)(3) and the probability surface for optimal pointing determined at substep (D)(5),
      (7) selecting as the object of interest the object with the highest numeric correspondence determined at substep (D)(6),
      (8) updating a position and direction of movement of each object, including the moving object of interest, in the two-dimensional virtual digital representation, and
      (9) the system server communicating to the mobile device an identity of the moving object of interest.

2. The method as recited in claim 1, wherein the mobile device and the system server communicate wired and wirelessly.

3. The method as recited in claim 1, wherein the mobile device geodetic position includes a position according to a latitude, longitude, elevation, pitch, and yaw of the mobile device.

4. The method as recited in claim 1, wherein the standard deviations relating to generating the mobile device geodetic position and pointing direction, include error propagation caused by mobile device sensors.

5. The method as recited in claim 4, wherein error propagations includes geodetic error propagation.

6. The method as recited in claim 1, wherein the distance estimate for each object, including the moving object of interest, includes a distance estimate from the mobile device geodetic position to a center of gravity of each object, including the moving object of interest.

7. The method as recited in claim 1, wherein a visible part of each object, including the moving object of interest, includes a visible part from the mobile device.

8. The method as recited in claim 1, wherein determining a probability surface for each object, including the moving object of interest, includes determining a probability surface according to an outline of each object, including the object of interest, from the mobile device geodetic position.

9. The method as recited in claim 1, wherein substep (D)(6) further includes determining a standard deviation for the actual pointing accuracy for each object, including the moving object of interest, in the two-dimensional virtual digital representation.

10. The method as recited in claim 9, wherein substep (D)(5) further includes determining for the probability surface for optional pointing a standard deviation for the optimal pointing location for each object, including the moving object of interest, in the two-dimensional virtual digital representation.

11. The method as recited in claim 10, wherein comparing at substep (D)(6) includes comparing the standard deviation for the actual pointing accuracy determined at substep (D)(3) and the standard deviation for the optimal pointing location using a t-test.

12. The method as recited in claim 11, wherein the numeric correspondence for each object, including the moving object of interest, includes a numeric correspondence of the overlap of the standard deviation for the actual pointing accuracy determined at substep (D)(3) and the standard deviation for the optimal pointing location.

13. The method as recited in claim 12, wherein numeric correspondence includes at least a lateral correspondence between the standard deviation for the actual pointing accuracy determined at substep (D)(3) and the standard deviation for optimal pointing location according to an x-axis in the two-dimensional virtual digital representation including the optimal point location and the actual pointing location.

14. The method as recited in claim 12, wherein numeric correspondence includes at least a vertical correspondence between the standard deviation for the actual pointing accuracy determined at substep (D)(3) and the standard deviation for the optimal pointing location according to a y-axis in the two-dimensional virtual digital representation including the optimal point location and the actual pointing location.

15. The method as recited in claim 1, wherein the mobile device includes a handheld device that includes capabilities of a pointing device.

16. A system for determining a likelihood a moving object in a real-world scene is an object being pointed at by a mobile device that includes capabilities of a pointing device, comprising:
- a mobile device that includes the capabilities of a pointing device for generating a geodetic position and pointing direction for the mobile device, and transmitting the mobile device geodetic position and pointing direction, and standard deviations relating to generating the mobile device geodetic position and pointing direction to a system server; and
- a system server further comprising,
  - a mapping module for receiving and processing a three-dimensional representation of an environment that contains a real-world scene with objects, including the moving object of interest,
  - a scene generator module that connects to the mapping module and receives an output from the mapping module that generates a two-dimensional virtual digital representation of the real-world scene including objects, including the moving object of interest, and determines for each object, including the moving object of interest, in the two-dimensional virtual digital representation a distance estimate from the mobile device geodetic position to each such moving object, including the moving object of interest,
  - a pointing accuracy module that determines for each object, including the moving object of interest, in the two-dimensional virtual digital representation an accuracy of actual pointing and in determining accuracy of pointing including the standard deviations transmitted from the mobile device caused by the mobile device in generating the mobile device geodetic position and pointing direction, and the distance estimate,
  - optimal pointing module that defines for each object, including the moving object interest, in the two-dimensional virtual digital representation an optimal pointing location relating to a visible part of each object, including the moving object of interest, and for each object, including the moving object of interest, in the two-dimensional virtual digital representation a probability surface for optimal pointing from the mobile device geodetic position to such objects, including the moving object of interest,
  - an updater for updating the position and/or direction of movement of each object of interest, including the moving object of interest, in the two-dimensional virtual digital representation in real time, and
  - a comparison module that determines for each object, including the moving object of interest, in the two-dimensional virtual digital representation, a numeric correspondence between actual pointing accuracy and optimal pointing location by comparing a standard deviation for actual pointing accuracy and a probability surface for optimal pointing for each such object, including the moving object of interest, and that selects as the object of interest the object with the highest numeric correspondence according to a comparison by the comparison module, and
  - a communications module that communicates with the mobile device with the communications including transmitting an identity of the moving object of interest to the mobile device.

17. The system as recited in claim 15, wherein the mobile device and system server communicate wired or wirelessly.

18. The system as recited in claim 15, wherein the mobile device includes sensors for determining mobile device geodetic location and pointing direction.

19. The system as recited in claim 18, wherein pointing device sensors cause mobile device geodetic position errors.

20. The system as recited in claim 19, when mobile device geodetic position includes a position according to a latitude, longitude, elevation, pitch, and yaw of the pointing device.

21. The system as recited in claim 15, wherein the comparison module includes a testing module for testing comparisons using a t-test.

22. The system as recited in claim 16, wherein the mobile device includes a handheld device that includes capabilities of a pointing device.

* * * * *